Patented Oct. 31, 1939

2,178,235

UNITED STATES PATENT OFFICE 2,178,235

METHOD OF PRODUCING DUSTLESS STARCH GRITS

William John Lauterbach, Pekin, Ill., assignor, by mesne assignments, to Corn Products Refining Company, New York, N. Y., a corporation of New Jersey No Drawing. Application June 17, 1937, Serial No. 148,659

10 Claims. (Cl. 127—32)

This invention relates to a process of treating starch, preferably corn starch, for the purpose of agglomerating the starch into granular grits, lumps or particles whereby the product will be free flowing and dustless. The desired product consists entirely of starch; that is, the treatment is not intended to convert any appreciable amount of starch into dextrine or other conversion substances.

A product of this general character has been made by passing starch in a moist state between internally heated rolls, from which the material is stripped in sheets after which the sheets are ground in a mill, and the ground product sieved to remove dust. The heat and pressure of the rolls effect a partial gelatinization of the starch, sufficient to bind the starch cells together. The difficulty in the operation of this process has been to adjust the factors producing gelatinization, i. e., heat, moisture, pressure, and length of time of treatment, so that, on the one hand, the material from the mill will not contain too much dust, through under-gelatinization, and on the other hand, the finished product will not contain hard, horny-like particles resulting from localized over-gelatinization. If the product contains any appreciable quantity of such hard, over-gelatinized particles, a sediment or sludge will be formed when the material is pasted, for example, in brewing, which makes the material inconvenient to use for this or like purposes.

The object of the present invention is to provide a novel and improved process for making dustless starch grits, or "brewers' grits" as they are sometimes called, by which the evils both of under- and over-gelatinization are avoided with more certainty and with less care and attention in carrying out the manufacturing process. That is to say, the process is of such character that the factors affecting the degree of gelatinization can be controlled with more certainty and more conveniently than is the case with the process involving gelatinization between heated rolls. From the brewer's standpoint it is of vital importance that the partial gelatinization be confined strictly within the limits above defined. Serious difficulties in the brewing process will be encountered if even as low as 1% or 2% of hard, horny, glassy surfaced starch particles are present in the grits.

According to the present process a water suspension of starch, preferably containing a small quantity of sulphur dioxide, is heated so as to bring about a partial gelatinization of the starch. That is, the starch cells are not disrupted, at least to any very considerable extent, but are to some degree swelled and enlarged. This partial gelatinization of the starch increases its cohesiveness, that is, the stickiness of the starch particles. If the starch treated contains sulphur dioxide, or other acid, the gelatinized starch should be neutralized with sodium carbonate or any other suitable neutralizing agent after which it is dewatered in a vacuum filter, centrifugal machine or other suitable dewatering apparatus, and the dewatered starch dried in a drying kiln or other drying apparatus. If desired, in order to improve the purity of the product, the neutralized starch magma before being dewatered may be passed over shaking sieves or through reels. The dried material is screened to remove the fines. The resultant product consists of small lumps or particles substantially free from dust. It will form a clear paste without sludge sediments when heated with water. It consists wholly of starch. It contains substantially no traces of dextrine or other conversion products of starch.

A specific example of the process is as follows:

The starch preferred is starch flushed from the tables, rather than washed starch, because the tabled starch will contain about .050 per cent $SO_2$, which facilitates the gelatinizing operation.

The flushed starch may have a density of 14° to 20° Baumé and may be treated at any such density. Preferably, however, the density is adjusted to 16.5° Baumé at 60° F. This liquor is pumped to a tank provided with hot water heating coils where it is heated for from one to thirty minutes at 140° to 152° F., preferably at 149° F. for ten minutes. This treatment of the starch gives it the requisite gelatinization for the desired purpose.

The material is then neutralized with sodium carbonate, or any other suitable neutralizing agent to give it a pH of about 4.9–5.3. It is preferably agitated from five to ten minutes after the neutralizing agent has been introduced.

The neutralized starch magma is then dewatered on a vacuum filter and the filter cake dried in the drying kilns ordinarily used for drying starch.

The dried material may be ground, but ordinarily this will not be necessary. From the kiln wagons it is put through rotary or other screening devices for removing the fine dustlike material from the lumps or grits. Preferably the fines are returned to the process, for example, to the gelatinizing tank for reprocessing.

The above example is given as typical and informative. The intention is to cover all modifications within the scope of the appended claims.

I claim:

1. Process of making dustless grits which comprises: giving the starch in suspension in water a degree of partial gelatinization equivalent to heating a water suspension of the starch having a density of 16.5° Baumé and containing approximately .050 per cent sulphur dioxide at 149° F. for about ten minutes; neutralizing the gelatinized magma to a pH of about 4.9–5.3; dewatering it; drying the dewatered material; and separating the dust from the grits.

2. Process of treating starch for the production of dustless grits containing substantially no hard, horn-like particles, which comprises: heating starch in suspension in water to a gelatinizing temperature for a period which will effect the swelling of the starch cells without substantial disruption thereof; de-watering the partially gelatinized starch magma thus formed; and then drying the same at a pressure not substantially in excess of atmospheric pressure.

3. Process of treating starch for the production of dustless grits containing substantially no hard, horn-like particles which comprises: heating starch in suspension in water and containing a small quantity of acid to a gelatinizing temperature for a period which will effect the swelling of the starch cells without substantial disruption thereof; introducing a neutralizing agent into the magma; de-watering said magma; and then drying the starch.

4. Process of treating starch for the production of dustless grits containing substantially no hard, horn-like particles which comprises: heating a water suspension of starch having a density of about 14°–20° Baumé to a gelatinizing temperature for a period which will effect the swelling of the starch cells without substantial disruption thereof; de-watering the partially gelatinized starch magma thus formed; and then drying the same.

5. Process of treating starch for the production of dustless grits containing substantially no hard, horn-like particles, which comprises: heating starch in suspension in water to a gelatinizing temperature for a period which will effect the swelling of the starch cells without substantial disruption thereof; de-watering the partially gelatinized starch magma thus formed; kiln-drying the starch; and screening out the fines.

6. Process of treating starch for the production of dustless grits which comprises: heating the starch in suspension in water to a gelatinizing temperature; discontinuing the heating of the starch as soon as partial gelatinization has occurred; de-watering the magma; and then drying the starch at substantially atmospheric pressure.

7. Process of treating starch for the production of dustless grits containing substantially no hard, horn-like particles, which comprises: heating a fluid suspension of starch to a gelatinizing temperature for a period which will effect the swelling of the starch cells without substantial disruption thereof; removing the fluid from the magma; drying the partially gelatinized starch; and then screening out the fines.

8. Process of treating starch for the production of dustless grits containing substantially no hard, horn-like particles, which comprises: heating a starch-water suspension containing substantially in excess of 30% moisture for a period and at a temperature which will effect partial gelatinization of the starch cells without substantial disruption thereof; de-watering the partially gelatinized starch magma; then heating the de-watered starch to dry the same.

9. Process of treating starch for the production of dustless grits containing substantially no hard, horn-like particles, which comprises: mixing starch with water in the proportions of 30% starch by weight (dry substance basis) and 70% water; heating the starch in suspension to a gelatinizing temperature for a period which will effect the swelling of the starch cells without substantial disruption thereof; dewatering the partially gelatinized starch magma thus formed; kiln-drying the starch; and screening out the fines.

10. Process of making dustless grits which comprises: mixing starch with water to provide a fluid suspension having a density of substantially 16.5° Baumé; heating the suspension thus obtained to a gelatinizing temperature for a period which will partially gelatinize the starch cells without substantial disruption thereof; dewatering the partially gelatinized starch magma thus formed; and then drying the same with heated air.

WILLIAM JOHN LAUTERBACH.